June 22, 1954

S. BOBIS ET AL 2,682,037

EQUALIZER

Filed Sept. 8, 1950

INVENTORS S. BOBIS
W. R. LUNDRY
BY
Ralph T. Holcomb
ATTORNEY

Patented June 22, 1954

2,682,037

UNITED STATES PATENT OFFICE 2,682,037

EQUALIZER

Stephen Bobis and Walter R. Lundry, Summit, N. J., assignors to Bell Telephone Laboratories, Incorporated, New York, N. Y., a corporation of New York Application September 8, 1950, Serial No. 183,872

1 Claim. (Cl. 333—28)

This invention relates to wave transmission networks and more particularly to adjustable multirange loss equalizers.

The principal object of the invention is to adjust the loss in a wave transmission system independently over a number of adjoining or overlapping frequency ranges.

Further objects are to reduce the flat loss, the number of component elements and the cost, and to simplify the construction, of an adjustable multirange loss equalizer.

In the embodiments disclosed herein the adjustable multirange loss equalizer in accordance with the present invention is adapted for operation between a source of alternating signals and a load to introduce an adjustable amount of loss in each of at least three overlapping frequency ranges. The loss may be either positive or negative relative to a constant, or flat, loss. The equalizer comprises at least three like impedance arms connected in like manner to form a coupling branch between the source and the load. Each arm is resonant at a different frequency, corresponding approximately to the maximum adjustable positive loss in one of the ranges, and comprises an inductance, a capacitance and an adjustable resistance. The inductance and capacitance in one of the arms have values determined by the impedance of the source, the impedance of the load, the resonant frequencies of the three arms, a factor chosen to make the loss of the equalizer substantially constant over all of the ranges for predetermined equal normal settings of the resistances, and the current ratio corresponding to this constant loss.

Four different circuit arrangements of the component impedance elements of the equalizer are shown. In two the inductance, capacitance and resistance in each arm are connected in series, the arms connected in parallel to form the coupling branch, and the coupling branch connected either in parallel or series with the source and the load. In the other two, the elements in each arm are connected in parallel and the arms are connected in series to form a coupling branch which is connected either in series or in parallel with the source and the load. Additional impedance elements may be included in order to improve the performance of the equalizer, especially over the highest and the lowest frequency ranges.

Compared with known types of adjustable multirange loss equalizers, the ones disclosed herein require fewer elements, cost less to manufacture, and have less flat loss. They are particularly useful where a large number of small loss adjustments are required, as in mop-up equalizers for television systems, but may also be used for larger but perhaps less precise adjustments.

The nature of the invention will be more fully understood from the following detailed description and by reference to the accompanying drawings, of which:

Figure 1:
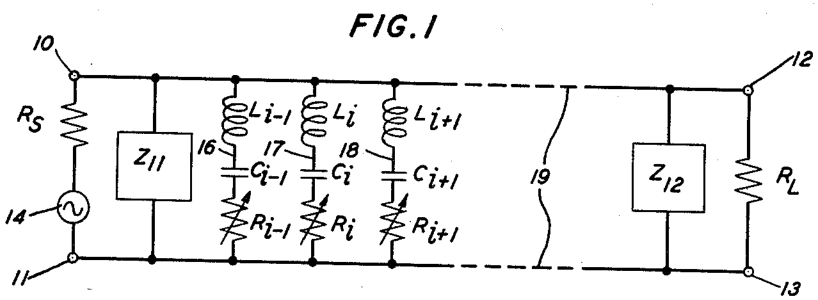
Figs. 1 and 2 are schematic circuits of adjustable equalizers in accordance with the invention in which the elements in each impedance arm are connected in series and the arms are connected in parallel to form a coupling branch which is connected in parallel or in series with the source and the load.

Taking up the figures in greater detail, the circuit of Fig. 1 shows one embodiment of an adjustable multirange loss equalizer in accordance with the invention comprising a pair of input terminals 10, 11 and a pair of output terminals 12, 13. A signal source of alternating electromotive force 14 of impedance $R_S$ is connected to the input terminals 10, 11 and a suitable load of impedance $R_L$ is connected to the output terminals 12, 13.

The equalizer comprises at least three like impedance arms 16, 17 and 18 connected in like manner to form a coupling branch between the source impedance $R_S$ and the load $R_L$. The equalizer will introduce an adjustable amount of loss, either positive or negative relative to the flat loss, in each of three frequency ranges, with maximum adjustable positive loss at the frequencies $f_{i-1}$, $f_i$ and $f_{i+1}$, respectively. More frequency ranges may be provided by adding more impedance arms similar to 16, 17 or 18, as indicated by the broken lines 19. An equalizer with more than fifty such arms, operable over a like number of frequency ranges, has been made and successfully tested.

In Fig. 1 each of the arms 16, 17 and 18 comprises an inductance, a capacitance and a variable resistance connected in series. In arm 17 these elements are, respectively, $L_i$, $C_i$, and $R_i$, in arm 16 they are $L_{i-1}$, $C_{i-1}$ and $R_{i-1}$, and in arm 18 they are $L_{i+1}$, $C_{i+1}$ and $R_{i+1}$. The arms 16, 17 and 18 are connected in parallel to form a coupling branch which is connected in parallel with the source impedance $R_S$ and the load $R_L$. Each of the arms 16, 17 and 18 is resonant at a different frequency corresponding approximately to the maximum adjustable positive loss in one of the frequency ranges.

The values of the inductance $L_i$ and the capacitance $C_i$ in arm 17 are determined by the source impedance $R_S$, the impedance of the load $R_L$, the three frequencies $f_i$, $f_{i+1}$ and $f_{i-1}$, a factor K chosen to make the loss of the equalizer substantially constant over all of the ranges for predetermined equal normal settings of the variable resistances $R_i$, $R_{i+1}$ and $R_{i-1}$, and the current ratio A corresponding to this constant loss. Explicitly, the elements $L_i$ and $C_i$ in arm 17 have approximately the following values:

$$L_i=\frac{R_{01}}{2\pi(f_{i+1}-f_{i-1})} \qquad (1)$$

and $$C_i=\frac{f_{i+1}-f_{i-1}}{2\pi f_i^2 R_{01}} \qquad (2)$$

where $$R_{01}=\frac{KR_SR_L}{(R_S+R_L)(A-1)} \qquad (3)$$

and the optimum value of K falls between two and three. Similar expressions may be set up for the values of the inductance and capacitance in each of the other arms 16 and 18. The minimum average value of the nominally constant flat loss is determined by the adjustment range required. The flat loss will ordinarily have small deviations from its average value. These deviations are, in general, reduced to tolerable amplitudes by sufficiently increasing the flat loss. For the range of K given, the normal value of each of the variable resistances will fall between 0.5 $R_{01}$ and 1.5 $R_{01}$.

It should be pointed out that the effect of the inclusion in Equations 1 and 2 of the frequencies $f_{i+1}$ and $f_{i-1}$ of the neighboring arms of the equalizer and the term $R_{01}$ is to take advantage of the contributions of those neighboring arms to the total conductance and thus the total loss of the equalizer arm for the frequency $f_i$ and the intermediate frequencies. It is an aspect of this invention that the interactions between neighboring arms of the equalizer are utilized to attain substantially flat normal conductance and loss characteristics for equal normal settings of the variable resistances $R_i$, $R_{i+1}$, and $R_{i-1}$ due to the elements $L_i$ and $C_i$ having the particular values determined by the Formulas 1, 2 and 3.

The two shunt impedance arms $Z_{11}$ and $Z_{12}$ are added, when required, to improve the loss characteristic, especially over the highest and the lowest frequency ranges, or to provide some special type of correction. They may include one or more inductances, capacitances or resistances and are designed to meet the partcular loss requirements of the equalizer.

Figures 2, 5:
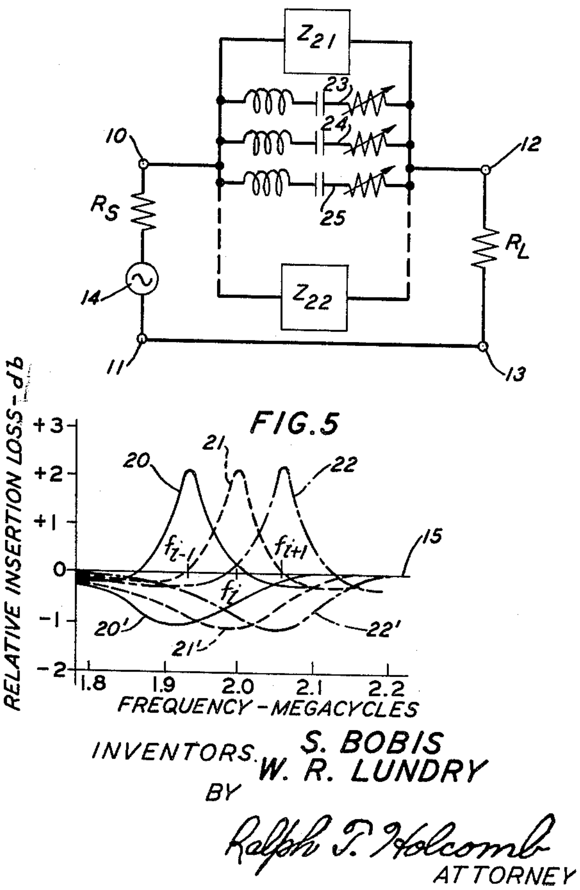
Fig. 5 shows typical insertion loss-frequency characteristics obtainable with the equalizer of Fig. 1.

Fig. 5 gives typical insertion loss-frequency characteristics obtainable with an equalizer of the type shown in Fig. 1. The loss in decibels relative to the average flat loss, shown by the horizontal line 15, is plotted against the frequency in megacycles. That is, the departure, either positive or negative, from the flat loss is shown. The solid-line curves 20 and 20' define the adjustment limits obtainable by varying the resistance $R_{i-1}$ while keeping the resistances $R_i$ and $R_{i+1}$ at their normal values. The broken-line curves 21, 21' and the dot-and-dash curves 22, 22' give the same limits for adjustments, respectively, of the resistances $R_i$ and $R_{i+1}$ with the other variable resistances set at their normal value. As already mentioned, the normal values for all of the resistances $R_i$, $R_{i+1}$ and $R_{i-1}$ required to give a flat loss are approximately equal. It will be noted that the frequency at which the maximum positive loss occurs in each range substantially coincides with the frequency of the maximum negative loss. The spacing of these maxima is dictated by the type of loss correction required. The pattern may, for example, be arithmetic, geometric, a combination of these, or of some other type. In the characteristics shown, each of the three positive loss curves 20, 21 and 22 overlaps the adjacent curve by at least half, and each of the negative curves 20', 21' and 22' overlaps the adjacent one by more than half.

Fig. 2 shows a second embodiment of the invention. The coupling branch is made up of the parallel combination of three arms 23, 24 and 25 and the impedances $Z_{21}$ and $Z_{22}$ which correspond, respectively, to the arms 17, 18, 19 and the impedances $Z_{11}$ and $Z_{12}$ in Fig. 1. In Fig. 2, however, the coupling branch is connected in series with the source impedance $R_S$ and the load $R_L$.

Figure 3:
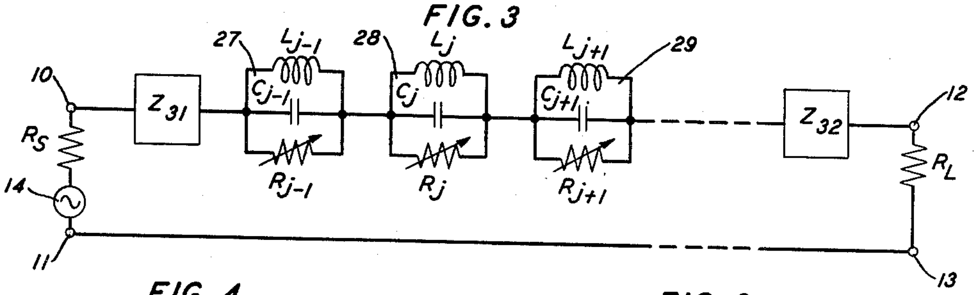
Figs. 3 and 4 show two other embodiments of the invention in which the elements in each arm are connected in parallel, the arms are connected in series to constitute the coupling branch, and the coupling branch is connected in series or in parallel with the source and the load.

A third embodiment of the invention is shown in Fig. 3. The coupling branch comprises the three arms 27, 28 and 29 and the two impedances $Z_{31}$ and $Z_{32}$ all connected in series with the source impedance $R_S$ and the load $R_L$. Each of the arms 27, 28 and 29 consists of the parallel combination of an inductance, a capacitance and a variable resistance. In arm 28 these elements are, respectively, $L_j$, $C_j$ and $R_j$, in arm 27 they are $L_{j-1}$, $C_{j-1}$ and $R_{j-1}$, and in arm 29 they are $L_{j+1}$, $C_{j+1}$ and $R_{j+1}$. The impedances $Z_{31}$ and $Z_{32}$ are included for the same purpose as the impedances $Z_{11}$ and $Z_{12}$ in Fig. 1. The arms 27, 28 and 29 are antiresonant, respectively, at the frequencies $f_{i-1}$, $f_i$ and $f_{i+1}$. The elements in the arm 28 have approximately the following values:

$$L_i=\frac{R_{02}(f_{i+1}-f_{i-1})}{2\pi f_i^2} \qquad (4)$$

and $$C_i=\frac{1}{2\pi(f_{i+1}-f_{i-1})R_{02}} \qquad (5)$$

where $$R_{02}=\frac{(R_S+R_L)(A-1)}{K} \qquad (6)$$

A has the same significance as in Equation 3, and K again has an optimum value falling between two and there to obtain a substantially flat loss over all of the ranges. For this range of K the normal value of each of the variable resistances required to give a flat loss falls between $R_{02}/0.5$, or $2R_{02}$, and $R_{02}/1.5$, or 0.67 $R_{02}$. Similar expressions may be written for the inductance and capacitance in each of the other arms 27 and 29.

Figure 4:
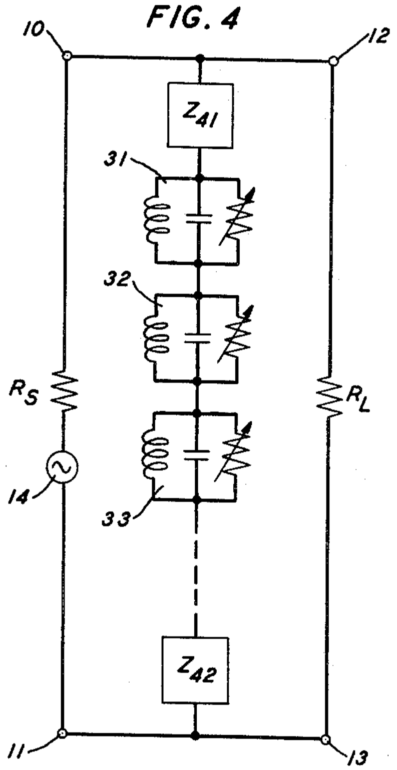

Fig. 4 shows a fourth embodiment of the invention. The coupling branch comprises the series combination of the arms 31, 32 and 33 and the impedances $Z_{41}$ and $Z_{42}$ which correspond, respectively, to the arms 27, 28, 29 and the impedances $Z_{31}$ and $Z_{32}$ in Fig. 3. However, in this case, the coupling branch is connected in parallel with the source impedance $R_S$ and the load $R_L$.

By proper design, loss characteristics similar to those given in Fig. 5 may be obtained with any one of the circuits shown in Figs. 2, 3 and 4. The choice of circuit depends, among other things, upon the magnitudes of the source impedance $R_S$ and the load impedance $R_L$ and upon the required values of the component elements. It will be understood, of course, that additional impedance arms may be employed in any of these circuits to provide additional adjustment ranges, if desired.

What is claimed is:

An equalizer for operation between a signal source of impedance $R_S$ and a load of impedance $R_L$ to introduce an adjustable amount of loss in each of at least three adjoining frequency ranges comprising at least three impedance arms connected directly in parallel with both said source and said load, each of said arms comprising the series combination of an inductance, a capacitance and an adjustable resistance, and the inductance $L_i$ and capacitance $C_i$ in one of said arms having approximately the values $$L_i=\frac{R_{01}}{2\pi(f_{i+1}-f_{i-1})}$$

and $$C_i=\frac{f_{i+1}-f_{i-1}}{2\pi f_i^2 R_{01}}$$

where $$R_{01}=\frac{KR_SR_L}{(R_S+R_L)(A-1)}$$

$f_i$ is the frequency of maximum adjustable loss in one of said ranges, $f_{i+1}$ and $f_{i-1}$ are, respectively, the frequencies of maximum adjustable loss in the ranges adjacent to said one range, K is a constant having a value between two and three chosen to make the loss of the equalizer substantially constant for predetermined equal settings of said resistances, and A is the current ratio corresponding to said substantially constant loss.

References Cited in the file of this patent

UNITED STATES PATENTS

| Number | Name | Date |
|---|---|---|
| 1,693,401 | Nyman | Nov. 27, 1928 |
| 2,182,328 | Weinberger | Dec. 5, 1939 |
| 2,550,595 | Pfleger | Apr. 24, 1951 |

FOREIGN PATENTS

| Number | Country | Date |
|---|---|---|
| 688,979 | France | May 20, 1930 |